US011856242B1

(12) United States Patent
Behera et al.

(10) Patent No.: US 11,856,242 B1
(45) Date of Patent: Dec. 26, 2023

(54) SYNCHRONIZATION OF CONTENT DURING LIVE VIDEO STREAM

(71) Applicant: Amazon Technologies, Inc., Seattle, WA (US)

(72) Inventors: Priyaranjan Behera, Sunnyvale, CA (US); Marshal Patel, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/663,900

(22) Filed: May 18, 2022

(51) Int. Cl.
*H04N 21/2187* (2011.01)
*H04L 65/65* (2022.01)
*H04N 21/238* (2011.01)
*H04N 21/43* (2011.01)
*H04N 21/472* (2011.01)

(52) U.S. Cl.
CPC ......... *H04N 21/2187* (2013.01); *H04L 65/65* (2022.05); *H04N 21/238* (2013.01); *H04N 21/4307* (2013.01); *H04N 21/47202* (2013.01)

(58) Field of Classification Search
CPC ... H04N 21/2187; H04N 21/238; H04L 65/65
See application file for complete search history.

(56) References Cited

U.S. PATENT DOCUMENTS

| | | | |
|---|---|---|---|
| 2018/0255332 A1* | 9/2018 | Heusser | H04H 20/18 |
| 2020/0321030 A1* | 10/2020 | Kellicker | H04N 21/44008 |

FOREIGN PATENT DOCUMENTS

WO WO-2019209269 A1 * 10/2019 .......... H04N 21/234

OTHER PUBLICATIONS

"AWS Elemental MediaLive Adds Support for Timed ID3 Metadata Insertion for HLS Streams". AWS, posted on Dec. 21, 2018, 1 page <URL: https://aws.amazon.com/about-aws/whats-new/2018/12/aws-elemental-medialive-adds-support-for-timed-id3-metadata-insertion-for-hls-streams/>.

* cited by examiner

*Primary Examiner* — Suraj M Joshi
(74) *Attorney, Agent, or Firm* — Weaver Austin Villeneuve & Sampson LLP

(57) ABSTRACT

Methods and apparatus are described for synchronizing primary and secondary content. In some embodiments, a host device may livestream primary content to a number of user devices in a group-watch setting. Secondary content (e.g., live or video-on-demand (VOD) content) from a separate source may also be provided to the user devices. A host user of the host device may initiate a control action (e.g., pause, seek, display advertisement) to the secondary content. To signal the control action to the user devices, the host device may embed metadata indicative of the desired control action into the primary content. A user device receiving the primary content including the metadata may apply the control action to the secondary content. Since control action data is embedded in the livestreamed primary content, the primary and secondary contents are synchronized, providing an optimal viewer experience without time lag between the intended action and the implemented action.

20 Claims, 8 Drawing Sheets

SYNCHRONIZATION OF CONTENT DURING LIVE VIDEO STREAM

BACKGROUND

With the advent of data communication infrastructure that is capable of broadcasting high-resolution and high-bandwidth media streams, users are able to view content and/or interact with other users in real time via livestreams. Remote co-viewing or group-watch experiences allow multiple or many users to watch and interact with content playback without requiring the users to be physically present at same geographic location. For example, viewers can access a streaming service where users generate their own content, and users and viewers who have a common interest can watch content together, such as a video clip or a livestream of a sports event, gameplay, a movie, short video clips, etc.

BRIEF DESCRIPTIONS OF DRAWINGS

DETAILED DESCRIPTION

One way in which an interactive video livestream service can be used to enhance the group-watch experience is for a host user (a viewer controlling the playback of content) to interact with viewers via the livestream on a primary video player of a user device, while the viewers (including the host) can watch live or pre-recorded video-on-demand (VOD) content on a secondary video player of the user device. For example, the host can be a sportscaster commenting on a sports event, a celebrity host discussing a movie or a show, etc.

However, undesirable latency may arise from delayed synchronization of the livestream content and the secondary content. Such broadcast latency can degrade the viewing experience during interactive live video streams. For example, the host user may pause the secondary content at a particular timestamp or frame, but viewers may see the paused frame several seconds later (e.g., 5-10 seconds after the host paused the content), causing the viewer to experience a mismatch between the host's livestream on the primary video player and the secondary content on the secondary video player.

The present disclosure provides techniques for synchronizing content streams, e.g., for group watching experiences. To overcome the latency between an intended control action (e.g., pause) by a host user and what the viewers see, metadata can be embedded in the primary content (e.g., video being livestreamed) to publish control signals to secondary video players. Since the control signal is embedded as part of the primary livestream content delivered to viewers from the host user, the primary content and the secondary content can be in sync, providing an optimal viewer experience. An example comparison illustrated by FIGS. 1 and 2 may be instructive.

Figure 1:
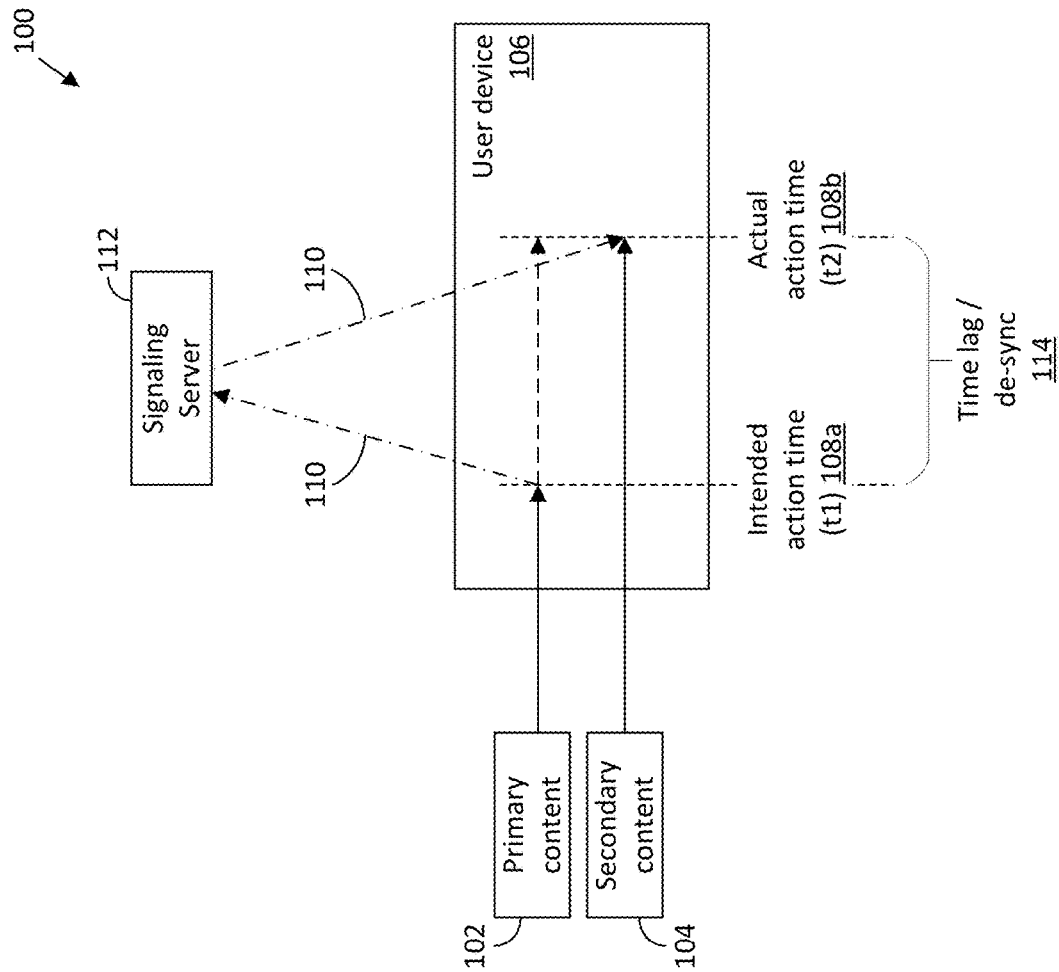
FIG. 1 illustrates an example content delivery system configured to transmit primary content and secondary content to a user device.

FIG. 1 illustrates an example content delivery system 100 configured to transmit primary content 102 and secondary content 104 to a user device 106. The primary content 102 may include audio, video, or both delivered to the user device 106 via a real-time messaging protocol (also referred to as a "livestream," "live stream," or "streaming" protocol), e.g., WebRTC or WebSocket. Other examples of the livestream protocol used to deliver the primary content 102 may include Hypertext Transfer Protocol (HTTP) Live Streaming (HLS), Dynamic Adaptive Streaming over HTTP (MPEG-DASH), Secure Reliable Transport (SRT), Real-Time Messaging Protocol (RTMP), and Real-Time Streaming Protocol (RTSP).

An example of primary content 102 may be a live video stream captured by a camera, microphone, and/or other audio-video equipment of a host user. For instance, one or more commentators may speak among themselves, which is captured and streamed to one or more user devices such that viewers can watch the video stream and listen to the audio.

Secondary content 104 may be delivered to the user device 106 separately from the primary content 102. In some cases, the secondary content 102 may be a livestream originating from a server separate from the server hosting the host user. The secondary content may originate, for example, from a server associated with a content publisher. In some cases, the secondary content 102 may be VOD content obtained from the content publisher. An example of secondary content 104 may be a live sports event. Another example may be a movie or other prerecorded content (VOD content uploaded to a video server).

Although the above examples are discussed in the context of one user device 106, there may be many viewers and user devices, reaching up to hundreds, thousands, tens or hundreds of thousands, millions, or more. Each viewer may be viewing the primary content 102 and/or the secondary content 104 on at least one device, such as the user device 106. At the scale noted above (e.g., hundreds of thousands), synchronization issues may arise, especially when users are geographically located throughout the world with varying network delays. Thus, it is desirable to have reliable synchronization of the primary content 102 and the secondary content 104 when any control signals are initiated by the host user.

The example content delivery system 100 depicted in FIG. 1 illustrates the primary content 102 and the secondary content 104 being delivered simultaneously to the user device 106. The host user may initiate a control action, at a first point in time (t1) 108a. As referred to herein, a host user in this context may be to a user who can control the delivery or playback of the primary content and/or the secondary content (such as a commentator, content creator, or streamer). A viewer may be a user who is receiving the primary content and/or the secondary content.

Examples of a control action may include pause, play (start playback), stop, seek (skip forward or back by a set temporal amount), jump to a particular timestamp, rewind or fast forward at a particular speed, increase or decrease playback speed, or insert or display advertisement or other secondary content. Various other control actions known to those skilled in the relevant arts may be used with similar effect. In some implementations, "trick mode" or "trick play" may be used to select a subset of frames for display to mimic visual feedback of analog systems, e.g., during rewind or fast-forward operations.

When the host user initiates the control action, a control signal 110 may be transmitted from the host user (e.g., at a device associated with the host user, e.g., a user device capable of initiating the control action) to a server (e.g., signaling server 112). The control signal 110 may include a command to enact the control action on the user device 106. To that end, the signaling server 112 may transmit the received control action to the user device 106 at or near a second point in time (t2) 108b. Upon receiving the control signal, the user device 106 may implement the intended control action at the second point in time (t2) 108b.

As an illustrative example, a "pause" signal may be initiated by a host user at a particular frame, timestamp, or scene of the secondary content 104 to provide commentary about the scene. Viewers may watch and listen to, e.g., using the user device 106, the host user begin speaking (via primary content 102) about the frame of the secondary content 104 selected by the host user. However, from the viewers' point of view, the secondary content 104 has not stopped at the frame. Until the control signal 110 sent by the host user reaches the viewer's user device 106, the secondary content 104 may continue to play while the primary content 102 is discussing a frame that has not yet been paused at the user device. The time delay 114 (caused by the difference between t2 and t1) causes a lack of synchronization between the primary content and the secondary content.

In existing implementations, this lack of synchronization is undesirable and frustrates the host user and the viewers. To this end, the present disclosure describes an improved approach to ensure synchronization of primary content and secondary content.

Synchronization of Primary and Secondary Content

Figure 2:
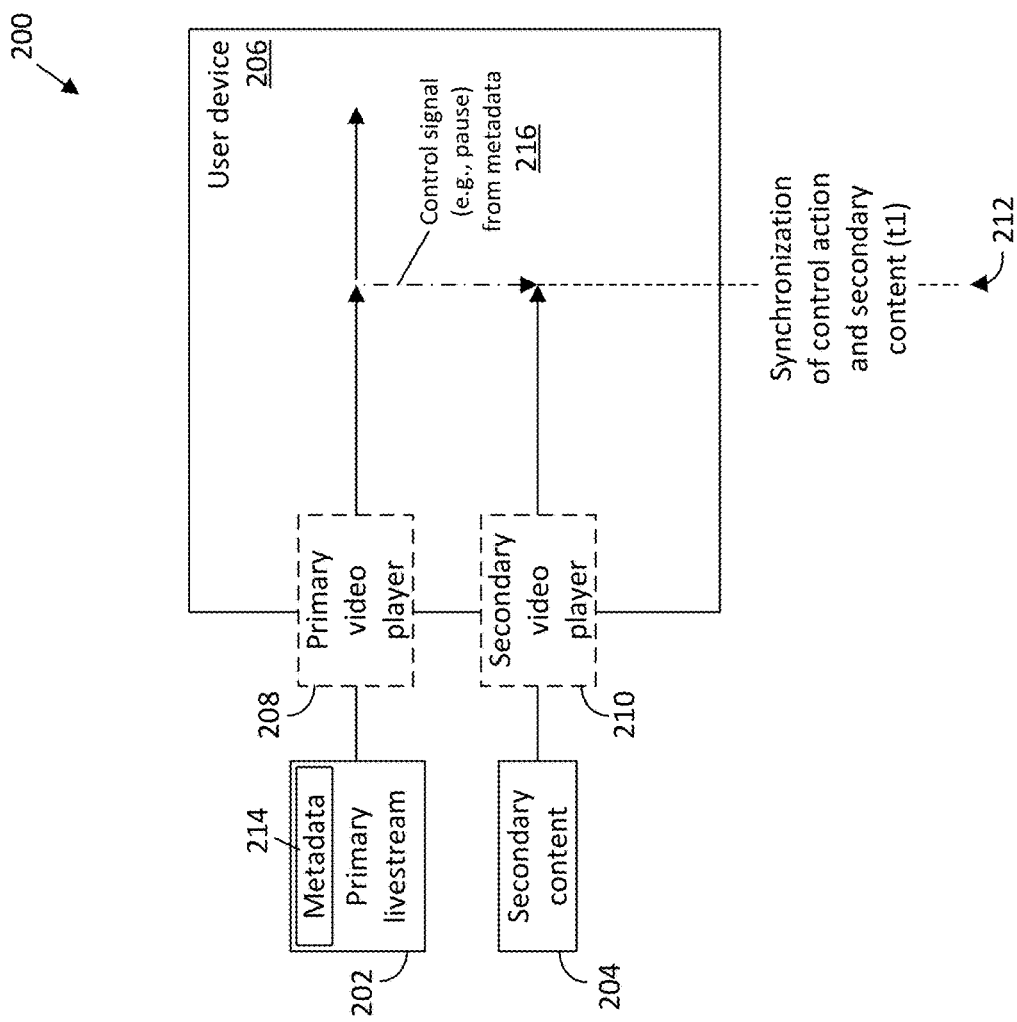
FIG. 2 illustrates a content delivery system configured to transmit and synchronize primary content and secondary content at a user device, according to some embodiments of the present disclosure.

FIG. 2 illustrates a content delivery system 200 configured to transmit and synchronize primary content 202 and secondary content 204 at a user device 206, according to some embodiments. In some embodiments, the primary content 202 may be included in a livestream that includes audio, video, or both delivered to the user device 106 via a real-time messaging protocol. In some implementations, HLS may be used as the real-time messaging protocol to deliver the primary content 202. An example HLS-based architecture is discussed below with reference to FIG. 3.

In some embodiments, primary content 202 may include a live video stream captured by a camera, microphone, and/or other audio-video equipment of a host device (e.g., a computerized device such as a personal computer, tablet, smartphone, etc.) associated with the host user. For instance, one or more commentators may speak among themselves such that viewers can watch the video stream and listen to the audio. In some implementations, the host user may cause the live primary content 202 to be delivered to the user device 206, specifically at, e.g., a primary video player 208.

In some embodiments, secondary content 204 may be delivered to the user device 206 separately from the primary content 202. The host use may select the secondary content and cause its delivery to the user device. In some cases, the secondary content 102 may be live content originating from a server not associated with the host user, e.g., a content publisher. In some cases, the secondary content 202 may be VOD content obtained from the content publisher or another server or service. An example of secondary content 204 may be a live sports event. Another example may be a movie or a show (VOD). In some implementations, the host user may select the secondary content to deliver to the user device 206, specifically at, e.g., a secondary video player 210.

Although the above examples are discussed in the context of one user device 206 for illustrative purposes, there may be many viewers and user devices, reaching up to hundreds, thousands, tens or hundreds of thousands, millions, or more. Each viewer may be viewing the primary content 202 and the secondary content 204 on at least one device, such as the user device 206.

In some embodiments, the primary content 202 and the secondary content 204 may be delivered simultaneously to the user device 206. In some embodiments, the user device 206 may be configured to display the primary content 202 on a first interface (e.g., primary video player 208), and display the secondary content on a second interface (e.g., secondary video player 210). That is, the viewer may be able to see the host user on the primary video player 208 (e.g., seeing the host discuss the secondary content live) while simultaneously seeing the secondary content on the secondary video player 210. The video players may display the respective contents, each in a selected resolution or size. In some implementations, the primary video player 208 and the secondary video player 210 may be displayed separately on one or multiple display devices or screens. In other implementations, the two video players 208, 210 may overlap at least in part. One example of the overlap may be a picture-in-picture mode, where one of the video players is smaller than the other and is a "floating" window above and within the other one of the video players.

In some scenarios, the host user may initiate a control action, at a first point in time (t1) 212. When the host user initiates the control action, metadata 214 may be embedded into the primary content in order to signal the control action to the user device 206. In some embodiments, the metadata 214 may be encapsulated in a metadata container, such as an ID3 tag. In some implementations, the ID3 tag may contain a payload, the payload including information relating to the control action, including, e.g., a command for the control action, a type of control action, a value indicating a timestamp or temporal location for the control action (e.g., frame or timestamp to pause or seek to), an identifier of the host (the user from which the control action is generated), an identifier of the publisher of the secondary content, and/or an identifier of a room or meeting in which the group watch is occurring. In some implementations, the metadata may include a JSON JavaScript Object Notation (JSON) string comprising the command and timestamp, which is recognized by at least the user device 206, the primary interface 208, and the secondary interface 210.

As the user device 206 receives the livestream of the primary content 202, the metadata 214 embedded (e.g., as an ID3 tag) in the primary content 202 at the time the host initiated the control action is also received by the user device 206. The user device 206 may be configured to identify the metadata container (e.g., the ID3 tag), extract and/or read the metadata 214, and determine the information relating to the control action, e.g., the command for the control action. Based on the determined information, a control signal 216 may be generated by the user device 206. The control signal 216 may be sent and applied to the secondary video player 210 to effectuate the command for the control action. By reading the metadata from the incoming livestream on the client (e.g., user device 206) itself, the control signal 216 can be published immediately, e.g., to the secondary video player 210, thus maintaining the primary content 202 (e.g., host user's livestream) and the secondary content 204 (e.g., live/VOD playback content) in sync. In effect, as the viewer sees the host's livestream and as the host takes a control action (e.g., pause) on the secondary content at or about time t1 of the secondary content, the viewer also sees the effect of the control action on secondary content synchronously, at time t1 of the secondary content.

As an example, the host user starts a livestream. Five minutes into the livestream, the host user starts playing VOD content (stored and retrieved at one or more servers separate from the host user) from the beginning. Viewers watch the livestream of the host user on a primary video player. At the 5-minute mark of the livestream, an ID3 tag indicating the information "PlayerTimeCode: 0" is inserted into the primary livestream. Viewers now see the host user on the primary video player, and also the VOD content starting to play on a secondary video player. Ten minutes into the livestream, the host user pauses the video to discuss a scene contained in the VOD content. An ID3 tag indicating the command and timestamp "eventType: PLAYBACK_PAUSE, PlayerTimeCode: 300" is inserted into the primary livestream because the video has been playing for 300 seconds (5 minutes). The ID3 tag is received at each viewer's user device as it receives the primary livestream, and the user device publishes the command to the secondary video player. Viewers now see the host user on the primary video player, with the VOD content paused on the secondary video player at the temporal location at which the host user paused, with little to no time lag. Since the metadata is included in primary content that is being delivered to all viewers, regardless of the number of viewers and the different network latencies experienced by the viewers, the group watch experience can be improved.

In some embodiments, a synchronization command may be embedded into the primary livestream content 202 at prescribed or dynamically determined time periods. For example, every 5 seconds (or another time period that may be determined based on the number of viewers, bandwidth, the nature of the secondary content, host user preference, etc.), a timestamp of the secondary content 204 currently displayed at the host device may be identified. A "PlayerTimeCode" metadata corresponding to the timestamp may be inserted into the primary content 202. When the user device 206 receives the primary content 202, the user device 206 may generate and publish a control signal for the "PlayerTimeCode" to the secondary video player 210 to cause the secondary content 204 to play at the identified timestamp, thereby periodically synchronizing the content even if a viewer is lagging or buffering, or was able to rewind or fast forward or otherwise access a portion of the secondary content 204 that is out of sync with the host user.

Figure 3:
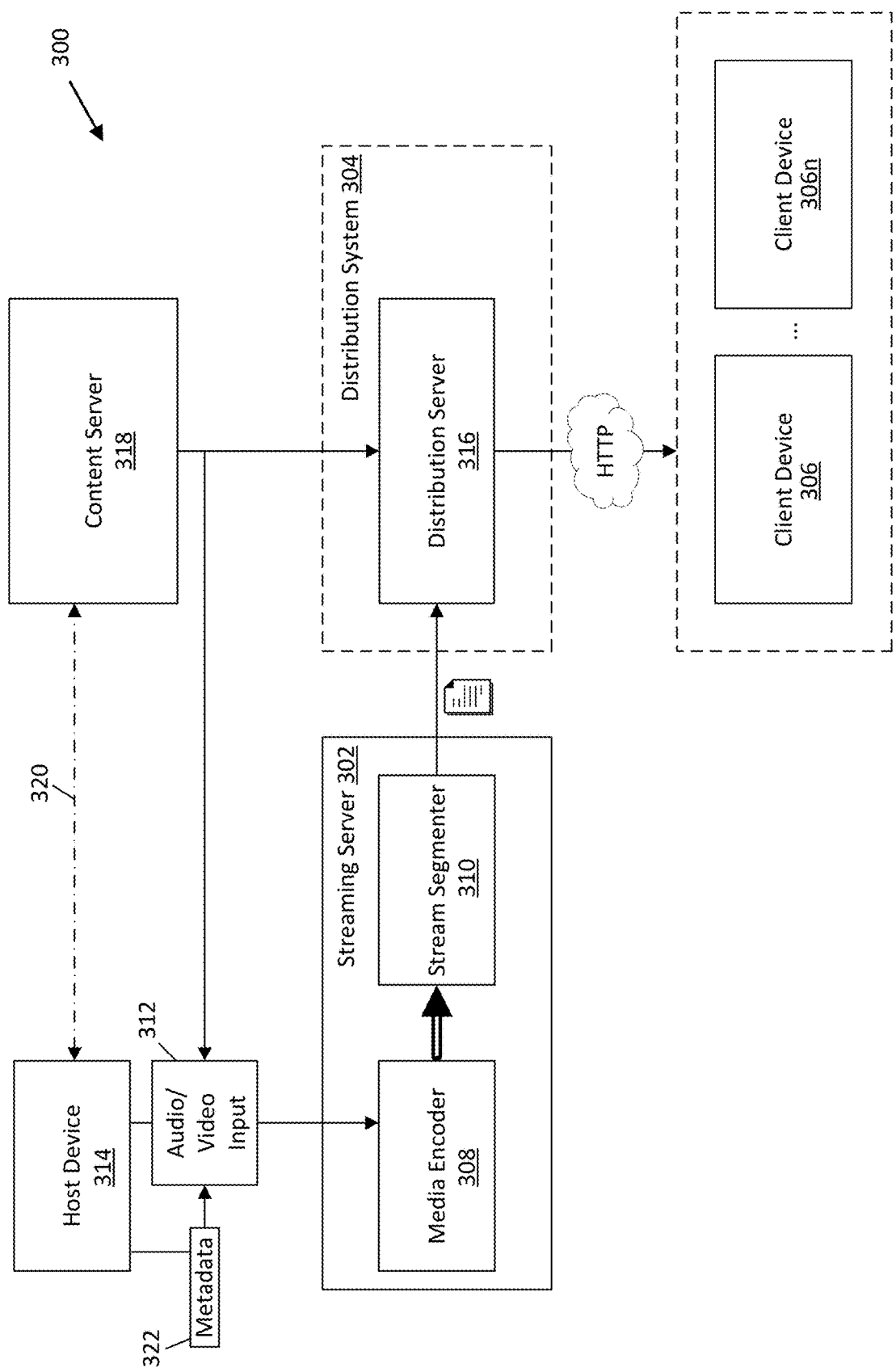
FIG. 3 illustrates an example HTTP Live Streaming (HLS)-based architecture for content delivery, useful for implementing the content delivery system discussed with respect to FIG. 2.

FIG. 3 illustrates an example HTTP Live Streaming (HLS)-based architecture 300 for content delivery, useful for implementing the content delivery system 200 discussed with respect to FIG. 2. In some embodiments, a streaming server 302 is configured to be communicatively coupled with a distribution system 304, and provide live streaming of content to a client device 308. The user device 206 of FIG. 2 may be an example of the client device 306.

In some embodiments, the streaming server 302 may include a media encoder 308 and a stream segmenter 310, and utilize these components to receive input streams of media and encode them in a format suitable for distribution using the distribution system 304. The media encoder 308 may be configured to receive a real-time signal (including, e.g., audio/video input 312) from a media device, such as a host device 314. The media encoder 308 may be further configured to encode the real-time signal into one of various video and audio encoding formats, such as H.264 video coding, MPEG-4 Advanced Video Coding (AVC), High-Efficiency Advanced Audio Coding (HE-AAC), or Dolby® Digital Plus (DD+) audio coding.

An example of the audio/video input 312 may be audio/video content captured by a camera, microphone, and/or other audio-video equipment of the host device 314, encoded or packetized for delivery to the streaming server 302. Another example of the audio/video input 312 may be audio/video content retrieved from a content server 318. The content server 318 may be operated by a content operator or content publisher, and configured to deliver content stored thereon. In some implementations, the host device 314 may send a signal 320 to the content server 318 to enable the content server 318 to stream audio/video content to the client device 306. The audio/video content from the host device 314 or the content server 318 may ultimately be livestreamed to or delivered for playback at the client device 306. For example, a host user may livestream primary content from the host device 314 and cause delivery of secondary content from the content server 318.

In some embodiments, the host device 314 may insert metadata 322 to the audio/video input 312. The metadata 322 may include data representative of a control signal, such as a command and timestamp for a control action (e.g., "eventType: PLAYBACK_PAUSE, PlayerTimeCode: 300"). As discussed with respect to FIG. 2, the metadata 322 may be included in a metadata container such as an ID3 tag. Hence, the host user's livestream itself may include a control signal, allowing the end user (e.g., at the client device 306) to receive the control signal as it streams the audio/video content.

In some embodiments, the encoded media may be delivered in a continuous stream to the stream segmenter 310 via a packaging format, such as MPEG-2 Transport Streams or another supported transport stream. The stream segmenter 310 may be configured to receive the transported media and divide it into a series of smaller media files. In some implementations, the media files may be saved as .TS files (MPEG-2 transport stream files) each having an equal duration, which may be reconstructed back into a continuous stream. The stream segmenter 310 may also be configured to create an index file (e.g., .M3U8 or .M3U file) containing references to each of the media files to indicate availabilities and locations (using, e.g., Uniform Resource Locators (URLs) or other location identifiers) of the media files. The index files may be updated according to a time period (e.g., every 5 seconds) or activity of the streaming server 302 (e.g., the stream segmenter 310 completes generating one or a group of new media files).

In some embodiments, the distribution system 304 may include at least one distribution server 316. The distribution server 316 may be configured to receive requests to deliver media (e.g., segmented media files) to a plurality of client device (e.g., 306, 306n) via HTTP. In some implementations, edge devices, other intermediary devices, and/or other content delivery networks (not shown) can also be used to deliver the media. Such intermediary network entities may be useful for larger-scale distribution of the media, such as group-watch livestream experiences.

In some embodiments, the client device 306 may be configured to receive the media stream and render it on an interface. The client device 306 may retrieve the index file from the streaming server 302 or the distribution server 316 based, e.g., on a URL identifying the stream. The index file may specify the locations of the available media files, any decryption keys, and/or any alternate streams available. The client device 306 may download the available media files in a prescribed (e.g., consecutive) sequence. Once a sufficient portion of the stream is retrieved, the client device 306 may presenting the reassembled stream to a user. The client device 306 may periodically retrieve updated index files.

In some embodiments, the client device 306 may include, display, or be coupled to a plurality of interfaces, such as a primary video player and a secondary video player. Primary video player 208 and secondary video player 210 of FIG. 2 may be examples of said interfaces. The client device 306 may be configured to display the livestream originating from the host device 314 on the primary video player, and display secondary content from the content server 318 on the secondary video player. In some embodiments, the client device 306 may read and extract metadata 322 (e.g., ID3 tag) embedded in the livestream, which may enable the client device 306 to apply a control action (e.g., pause) associated with the metadata contents to the secondary content on the secondary video player, and thereby synchronize the primary and secondary content using an embedded control action from the host user, as discussed above.

The contents of the metadata may be in a serialized string, e.g., JSON blob, containing information relevant to timestamp, control action (pause, play, seek, etc.), and/or other data related to the group viewing session. Example contents of the ID3 tag may include the following information:
{
  pubUUID: 'pub-uuid-123',
  chatDisplayName: 'user',
  itvChatRoomId: 'chat-room-uuid-123',
  attendeeUUID: 'attendee-uuid-123',
  roomCode: '123',
  eventType: InteractiveTvChatRoomEvent.PLAYBACK_PLAY,
  isHosted: true,
  metadata: {
    message: 'user started playing',
    originPlayerTimeCode: 112000
  }
}

It should be noted that the metadata contents can be encapsulated using various other formats, string types, etc. such that the metadata can be embedded in the livestream and is deliverable via the livestream.

Figure 4A:
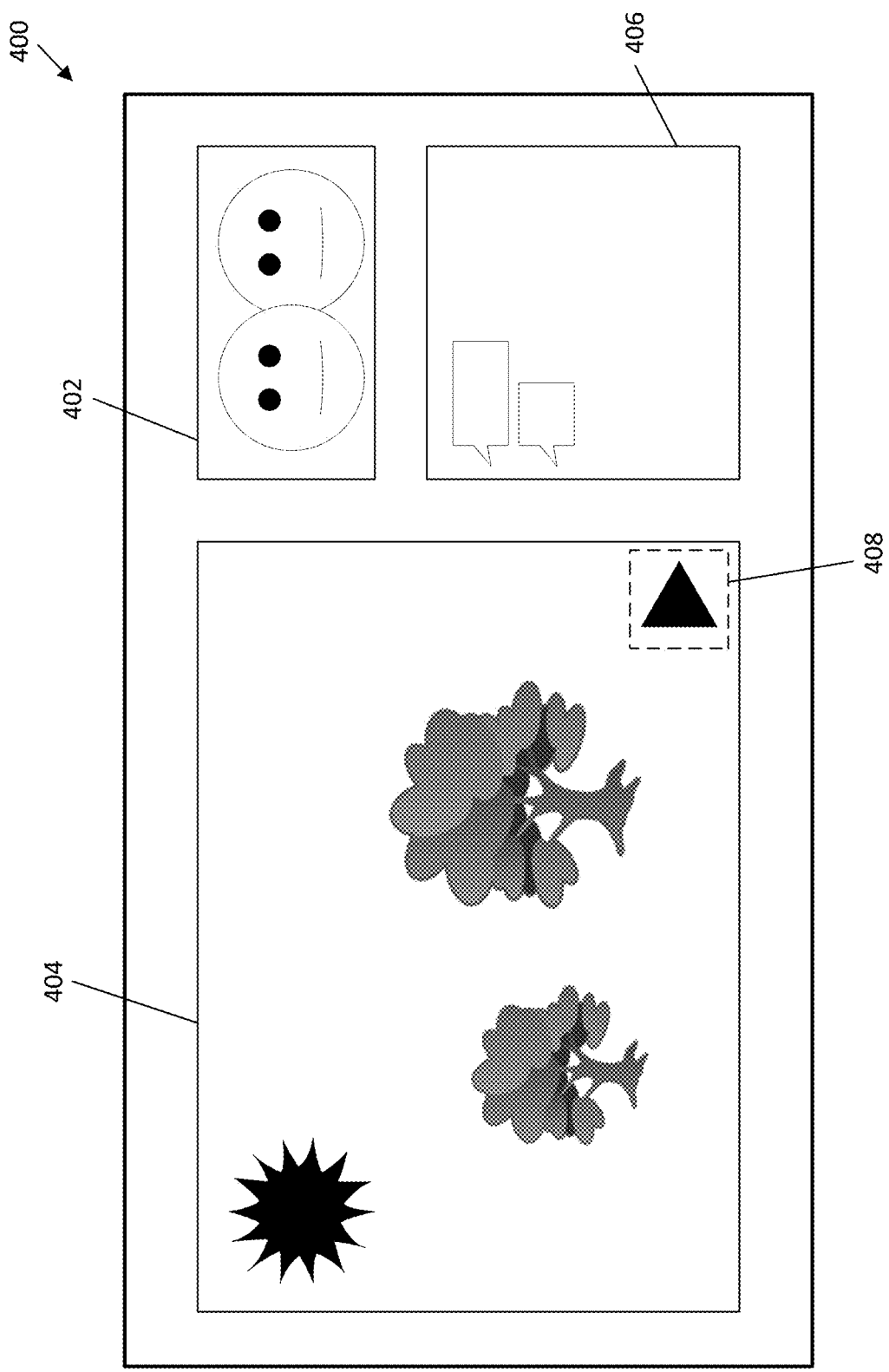
FIGS. 4A and 4B illustrate an example display interface at a user device at first and second times, according to some embodiments.

FIG. 4A illustrates an example display interface 400 at a user device at a first point in time, according to some embodiments. In some embodiments, the display interface 400 may include a first interface (e.g., primary video player 402) and a second interface (e.g., secondary video player 404). The primary video player 402 may display primary livestream content from a host user. The secondary video player 404 may display secondary streamed content from another source (e.g., a content publisher). The streamed content may be another livestream (e.g., a sports event) or VOD content (e.g., a movie trailer uploaded to a video server). In some implementations, an interaction interface 406, such as a chat box to enhance the group-watch experience, may also be displayed. Depending on the application, these interfaces and contents shown may be shown to any user who joins or accesses the livestream, although in some cases, the contents may be privately accessible to users with credentials. Various other user-interface (UI) elements such as options, and information about the contents, and the like, may also be included within the display interface 400. In some implementations, playback status 408 may be shown as part of the secondary video player 404 and/or the primary video player 402. In some implementations, the primary video player video player may also have a UI element such as one or more control elements (e.g., buttons) to manually pause, play, or otherwise adjust (e.g., resolution) the primary livestream.

As shown in FIG. 4A, a scene from the secondary content is rendered and displayed in the secondary video player 404. The viewer in the primary video player 402 may show the host user and one or more additional hosts, if any. The host user and the viewer may be watching a playback (indicated by the play icon as the playback status 408) of the secondary content and interacting with one another in the interaction interface 406.

Figure 4B:
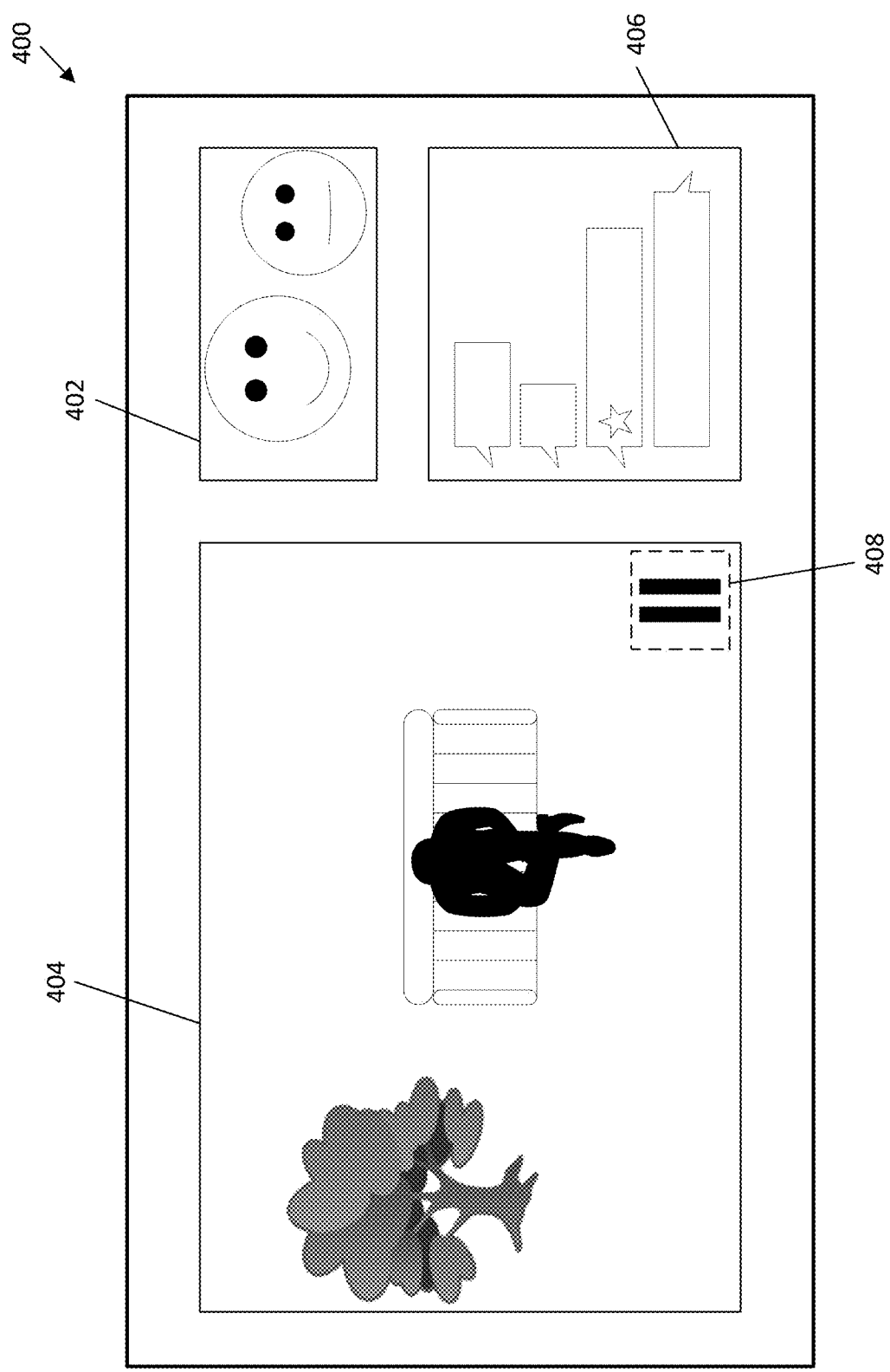

FIG. 4B an example display interface 400 at a user device at a second point in time, according to some embodiments. Another scene from the secondary content is rendered and displayed in the secondary video player 404. The host user may have initiated a control action of "pause" at a timestamp this scene. Metadata indicating the control action may be received at the user device—in fact, at each of numerous devices receiving the primary livestream. A control signal may be published to the secondary video player 404, causing the secondary content to pause at the exact scene. Meanwhile, the host user may continue to provide the livestream and discuss the scene here, displayed in primary video player 402. Additional messages may be posted by the host user and viewers in the interaction interface 406. Thus, the secondary content is synchronized with the primary content, and the time delay experienced in group-watch settings of existing implementations is eliminated.

In other words, when a host user pauses the secondary content at a scene and starts discussing the scene, there is no confusion or degradation of user experience because the secondary content will not continue to play and during a discussion of a scene that has already passed. Instead, the discussion will relate to the exact frame the host intended to pause at.

Even in scenarios in which the primary livestream is delayed (which may occur because of, e.g., latency or a lower-quality network connection on the viewer side), the primary livestream and the secondary content may still be kept synchronized. Although adjusting the bitrate, resolution, or other audio-video qualities (from either the host device or the user device) may improve latency, such delays may still occur due to the viewer's network quality, and vice versa. As described above and elsewhere herein, the metadata with the control action may include a playback signal to start playback of the secondary content at the desired timestamp, or a pause signal to pause playback of the secondary content at the desired timestamp. By way of example, a livestream content that is 15 seconds behind (received 15 seconds after other viewers) will still have the same control action information embedded therein as livestream content that is not behind. Both the on-time and delayed livestream contents would include a control action to play at timestamp 0:00 as the control action is received via the livestream contents, thereby synchronizing the primary livestream (irrespective of the delay) and the secondary content. Subsequent control signals would also keep the primary livestream and the secondary content synchronized.

In some cases, however, the secondary content may appear to skip back some frames because of the time it takes for the metadata to arrive at the user device. That is to say, the secondary content may continue to play for approximately a second or so, for example, but revert back to the temporal location at which the host paused and indicated by the metadata embedded into the livestream when the pause control action was initiated.

In other scenarios, other control actions (e.g., seek, jump, rewind, fast forward, display advertisement, etc.) can be similarly employed using the approach described thus far.

In some implementations, at least one advertisement may be embedded into the display interface 400, in response to a "display advertisement" control action, e.g., at a particular timestamp. Advertisements may be considered secondary content, and hence, retrievable from a content server, such as content server 318 or another content server configured to store advertising content. In some cases, an advertisement may be audio content, video content, or both. In some cases, an advertisement may be static or animated image content, text, or both. The advertisement can be related to the original secondary content. For example, a scene in the original secondary content may show a beverage, and the host device may decide to display an advertisement for a beverage company. In some cases, the advertisement may be displayed at the secondary video player 404, replacing and switching the original secondary content with the advertisement, or overlaying the advertisement over the original secondary content. At any time after the advertisement begins (e.g., in the middle of a video advertisement or after it has finished showing the video advertisement), the original secondary content may resume playing or in a paused state. In some cases, the advertisement may be displayed in an interface separate from the secondary video player 404; e.g., it may be displayed as a banner elsewhere on the display interface 400. In some cases, the original secondary content and the advertisement may be displayed concurrently. For example, the advertisement may play or be displayed in a smaller overlay interface over the original secondary content, or it may be shown in a banner while the original secondary content continues to play.

In some embodiments of the display interface 400, primary and secondary video players 402, 404 may be overlapped at least partially. In some implementations, the primary video player 402 may be laid over the secondary video player 404 in a picture-in-picture mode. In some implementations, the primary and secondary video players 402, 404 (and/or the interaction interface 406) may each be a window floating over the display interface, allowing at least partial overlap over one another.

Methods

Figure 5:
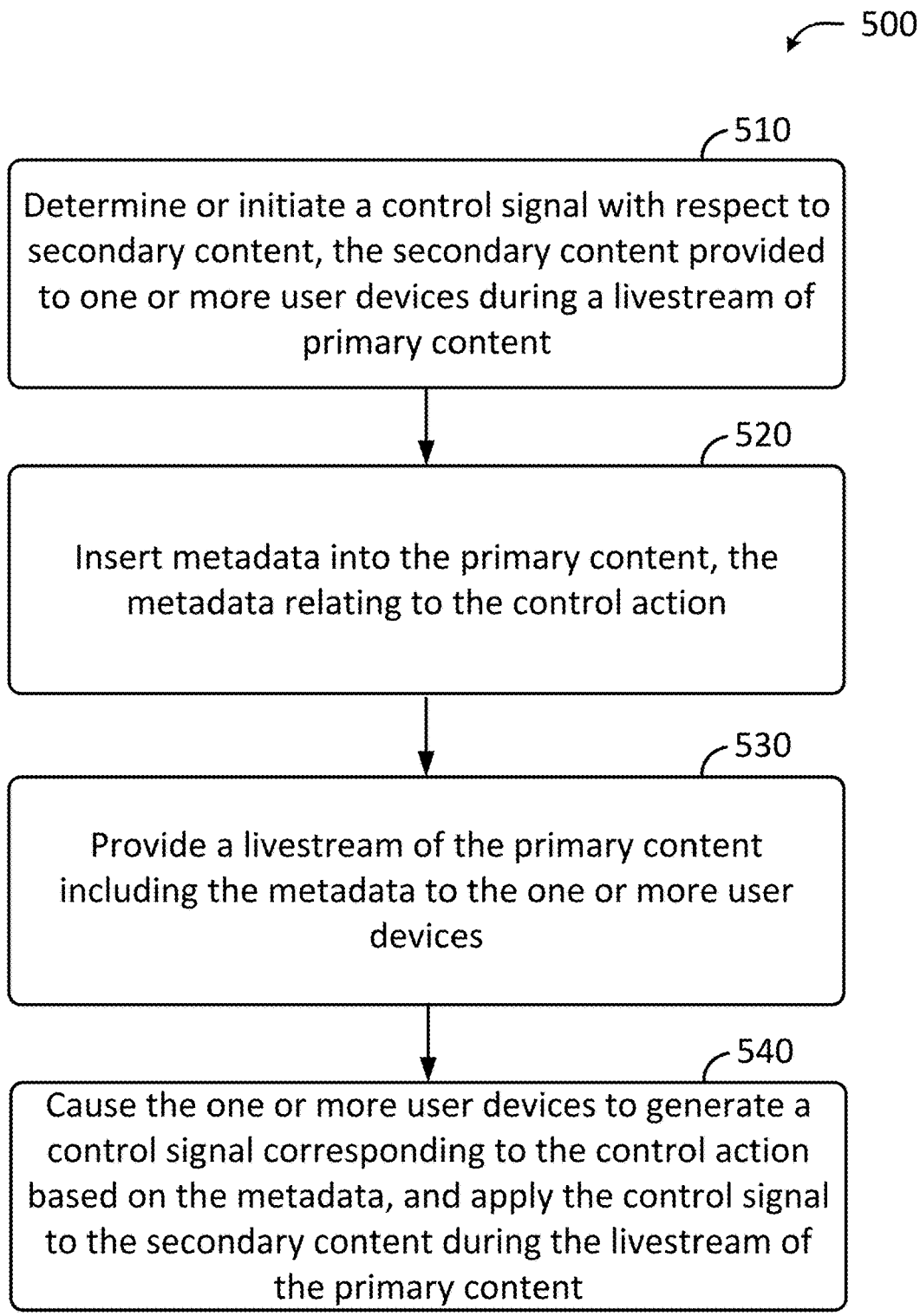
FIG. 5 illustrates a method of synchronizing content streams, according to some embodiments.
Figure 7:
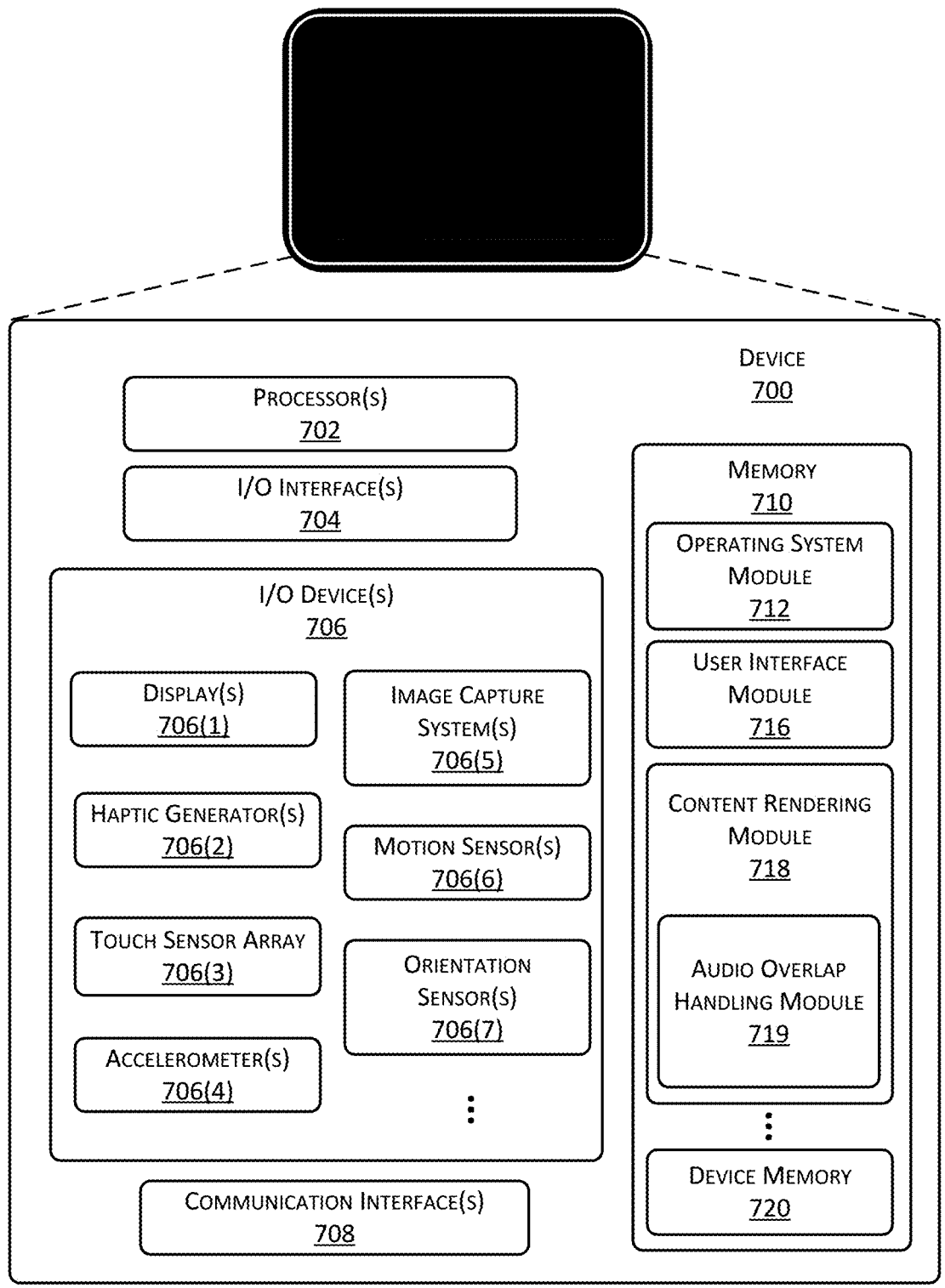
FIG. 7 is a block diagram of an example of a user device suitable for use with various embodiments discussed herein.

FIG. 5 illustrates a method 500 of synchronizing content streams, according to some embodiments. The functionality illustrated in one or more of the blocks shown in FIG. 5 may be performed by hardware (e.g., processor) and/or software components of a computerized apparatus or a networked entity such as a server apparatus, or a computer-readable apparatus including a storage medium storing computer-readable and/or computer-executable instructions that are configured to, when executed by a processor apparatus, cause the at least one processor apparatus or the computerized apparatus to perform the operations. Example components of the computerized apparatus or networked entity are illustrated in FIG. 7, which are described in more detail below.

It should also be noted that the method 500 may include additional or fewer operations than those depicted in FIG. 5 to perform the content synchronization.

At block 510, the method 500 may include determining or initiating a control action with respect to secondary content, the secondary content provided to one or more user devices during a livestream of primary content. More specifically, in some implementations, a host device may determine a control action with respect to a timestamp associated with secondary content. Examples of the control action may include, depending to the scenario, pause, play (start playback), stop, seek (skip forward or back by a set temporal amount), jump to a particular timestamp, rewind or fast forward at a particular speed, increase or decrease playback speed, or insert or display advertisement or other secondary content.

In some embodiments, the livestream of the primary content may be a livestream of user-generated content by a host device. In some implementations, a host user may transmit audio/video content that is captured using a camera, microphone, and/or other audio-video equipment of the host device (e.g., a computerized device such as a personal computer, tablet, smartphone, etc.). In some cases, the secondary content may be live content originating from a server not associated with the host user, e.g., a content publisher. In some cases, the secondary content may be VOD content obtained from the content publisher or another server or service. As one example, the host user or host users may stream themselves and the environment they are in (livestream of primary content), and may discuss the secondary content that the host has selected to watch with viewers. FIG. 4A illustrates one example of an interface that is configured to display the primary content and the secondary content on respective interfaces 402, 404.

At block 520, the method 500 may include inserting metadata into primary content. In some embodiments, the metadata may be encapsulated in a metadata container, e.g., an ID3 tag. The metadata may be readable by the user devices, and may include a timestamp associated with the secondary content, and a command representing the control action, among other things. Timestamp data and command data may be embedded in the primary content as it is streamed to the one or more user devices (see block 530). For example, an ID3 tag indicating the command and timestamp "eventType: PLAYBACK_PAUSE, PlayerTimeCode: 300" is inserted into the primary livestream to indicate that the secondary content should be paused at the 300-second mark.

At block 530, the method 500 may include providing a livestream of the primary content including the metadata to the one or more user devices. In some embodiments, a streaming protocol such as HTTP Live Streaming (HLS) may be used to provide the livestream to the user devices. In some embodiments, an HLS-based architecture 300 as depicted in FIG. 3 may be used to deliver the primary content to the user devices (e.g., 306 and/or 306n). User devices may also receive secondary content using the HLS-based architecture 300. HLS may be used to deliver the primary content (and secondary content) at large scale for a group-watch experience, e.g., with thousands or millions of users and user devices.

At block 540, the method 500 may include causing the one or more user devices to generate a control signal corresponding to the control action based on the metadata, and apply the control signal to the secondary content during the livestream of the primary content. In some embodiments, the metadata may be read by each of the one or more user devices upon receiving the primary content, and the one or more user devices may generate and send or publish a control signal to apply the control action. More specifically, in some embodiments, and as shown for example in FIG. 4A, the primary content may be rendered on one interface (e.g., primary video player 402) and the secondary content may be rendered on another interface (e.g., secondary video player 404). The control signal may be generated at the user device and published to the secondary video player. Continuing the above example (block 520), the control signal may indicate to the user device to pause the secondary content at the secondary video player at the 300-second mark. Since the metadata is received at the same time the primary content is received, the primary content and the secondary content are synchronized.

As a practical illustration, a host user may begin to speak about a frame of the secondary content at the 300-second mark. The "pause at 300-second mark" control action will be published to each user device as such discussion begins to take place, rather than the control action being applied several seconds after the discussion begins.

Figure 6:
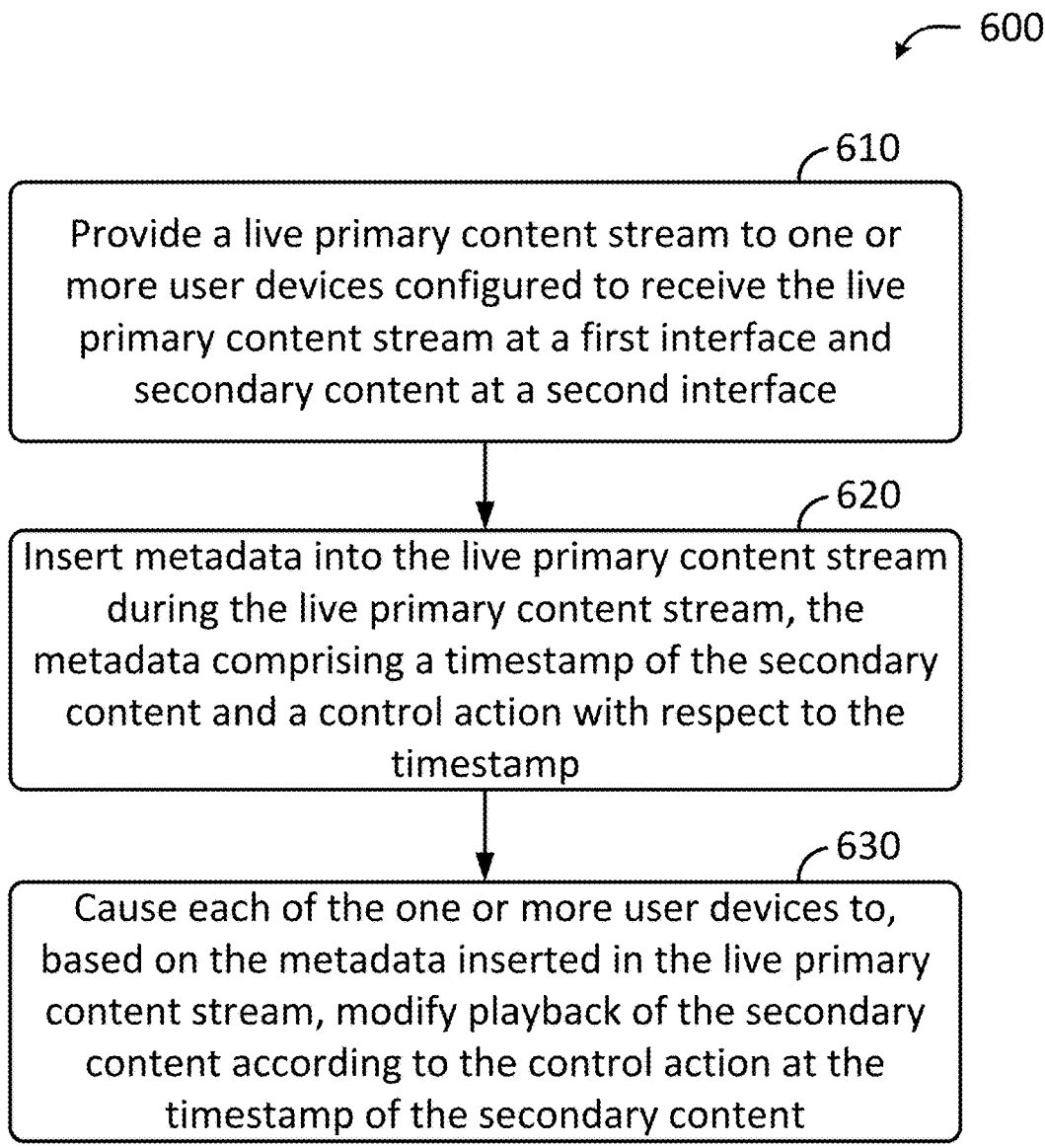
FIG. 6 illustrates another method of synchronizing content streams, according to some embodiments.

FIG. 6 illustrates a method 600 of synchronizing content streams, according to some embodiments. The functionality illustrated in one or more of the blocks shown in FIG. 6 may be performed by hardware (e.g., processor) and/or software components of a computerized user apparatus, or a computer-readable apparatus including a storage medium storing computer-readable and/or computer-executable instructions that are configured to, when executed by a processor apparatus, cause the at least one processor apparatus or the computerized user apparatus to perform the operations. Example components of the computerized user apparatus are illustrated in FIG. 7, which are described in more detail below.

It should also be noted that the method 600 may include additional or fewer operations than those depicted in FIG. 6 to perform the content synchronization.

At block 610, the method 600 may include providing a live primary content stream to one or more user devices configured to receive the live primary content stream at a first interface and secondary content at a second interface. In some embodiments, the live primary content stream may be provided to the one or more user devices via a streaming protocol such as HTTP Live Streaming (HLS). For example, the HLS-based architecture 300 of FIG. 3 may be used. In some embodiments, the first interface may include a primary video player configured to render at least the live primary content stream from a host device of a host user, and the second interface may include a secondary video player configured to render at least the secondary content. Secondary content may include live or VOD content retrieved from a content publisher or another server or service other than the host user.

At block 620, the method 600 may include inserting metadata into the live primary content stream during the primary live content stream. In some embodiments, the metadata may be readable by the user devices, and may include a timestamp of the secondary content and a control action with respect to the timestamp (e.g., a control action to be applied to the secondary content at the timestamp of the secondary content). In some embodiments, the metadata may be included in an ID3 tag, including timestamp data and control action data (e.g., "eventType: PLAYBACK_PAUSE, PlayerTimeCode: 300") among other things.

At block 630, the method 600 may include causing each of the one or more user devices to, based on the metadata inserted in the live primary content stream, modify playback of the secondary content at the timestamp of the secondary content according to the control action. In some embodiments, the metadata may be read by each of the one or more user devices upon receiving the primary content, and the one or more user devices may generate and send or publish a control signal to the second interface to modify playback of the secondary content according to the control action. Examples of the modification of playback may include, depending to the scenario, pause, play (start playback), stop, seek (skip forward or back by a set temporal amount), jump to a particular timestamp, rewind or fast forward at a particular speed, increase or decrease playback speed, or insert or display advertisement or other secondary content.

In one example, the timestamp data and control action data (e.g., "eventType: PLAYBACK_PAUSE, PlayerTimeCode: 300") may indicate to the secondary video player to pause at time 300 (300-second mark) when the live primary content stream is received, thereby synchronizing the primary content and the secondary content.

Apparatus

FIG. 7 is a block diagram of an example of a user device 700 suitable for use with various embodiments discussed above. As alluded to above, it should be understood that user device 700 may be any of a wide variety of device types. In some embodiments, user device 700 (depicted as a tablet device) may include one or more single or multi-core processors 702 configured to execute stored instructions (e.g., in device memory 720). User device 700 may also include one or more input/output (I/O) interface(s) 704 to allow the device to communicate with other devices. I/O interfaces 704 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 704 may be coupled to one or more I/O devices 706 which may or may not be integrated with client device 700.

User device 700 may also include one or more communication interfaces 708 configured to provide communications between the device and other devices. Such communication interface(s) 708 may be used to connect to cellular networks, personal area networks (PANs), local area networks (LANs), wide area networks (WANs), and so forth. For example, communications interfaces 708 may include radio frequency modules for a 3G, 4G, or 5G cellular network, a WiFi LAN and a Bluetooth PAN. User device 700 may also include one or more buses or other internal communications hardware or software (not shown) that allow for the transfer of data and instructions between the various modules and components of the device.

User device 700 may also include one or more memories (e.g., memory 710). Memory 710 may include non-transitory computer-readable storage media that may be any of a wide variety of types of volatile and non-volatile storage media including, for example, electronic storage media, magnetic storage media, optical storage media, quantum storage media, mechanical storage media, and so forth. Memory 710 may provide storage for computer readable instructions, data structures, program modules and other data for the operation of user device 700. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 710 may include at least one operating system (OS) module 712 configured to manage hardware resources such as I/O interfaces 704 and provide various services to applications or modules executing on processor(s) 702. Memory 710 may also include a user interface module 716, a content rendering module 718, and other modules.

Memory 710 may also include device memory 720 to store a wide variety of instructions and information using any of a variety of formats including, for example, flat files, databases, linked lists, trees, or other data structures. Such information includes content for rendering and display on display 706(1) including, for example, any type of video content.

In some embodiments, display 706(1) may be a screen configured to multiple independent interfaces or video players, as illustrated in FIGS. 4A and 4B. In some embodiments, display 706(1) may include one or more external screens, for example, a first screen and a second screen configured to display primary content and secondary content.

In some embodiments, a portion of device memory 720 may be distributed across one or more other devices including servers, network attached storage devices, and so forth.

The logic used to handle overlaps between the audio components of successive periods of content (represented by 719 in FIG. 7) may be implemented in a variety of ways, e.g., in hardware, software, and/or firmware. It will also be understood that user device 700 of FIG. 7 is merely an example of a device with which various implementations enabled by the present disclosure may be practiced, and that a wide variety of other device types may also be used. The scope of this disclosure should therefore not be limited by reference to device-specific details.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computerized system configured to synchronize content streams for group watching, the system comprising:
a host device; and
one or more user devices communicatively coupled to the host device via a network;
wherein the host device is configured to:
provide a livestream of primary content to the one or more user devices;
receive a control signal to apply a control action to secondary content provided from a secondary content source; and
insert metadata into the livestream of the primary content, the metadata including a command representing the control action being applied to the secondary content, and a timestamp indicating a frame of the secondary content at which the control action is being applied; and wherein the one or more user devices are each configured to:
render the livestream of the primary content from the host device and the secondary content from the secondary content source simultaneously; and
based on receipt of the metadata in the livestream of the primary content, apply the control action to the secondary content at the frame of the secondary content indicated by the timestamp during the livestream of the primary content.

2. The computerized system of claim 1, wherein:
the control signal is configured to perform one of pausing the secondary content at the timestamp, seeking to another frame of the secondary content from the timestamp, or start playing the secondary content at the timestamp.

3. The computerized system of claim 1, wherein the metadata is provided in an ID3 tag, and
the command representing the control action comprises a JSON (JavaScript Object Notation) string that is executable by the one or more user devices.

4. The computerized system of claim 1, wherein the livestream of the primary content is provided via an HTTP live streaming (HLS) protocol.

5. A computer-implemented method comprising:
providing a live primary content stream to one or more user devices each configured to receive the live primary content stream at a first interface and secondary content at a second interface; and
inserting metadata into the live primary content stream during the live primary content stream, the metadata comprising a timestamp of the secondary content and a control action being applied to the secondary content at the timestamp of the secondary content;
wherein the metadata inserted in the live primary content stream causes execution of a command at each of the one or more user devices to modify playback of the secondary content at the timestamp of the secondary content according to the control action.

6. The computer-implemented method of claim 5, wherein the insertion of the metadata comprises insertion of an ID3 metadata container into the live primary content stream, the ID3 metadata container comprising the timestamp and the control action.

7. The computer-implemented method of claim 5, wherein the first interface and the second interface are configured to display the live primary content stream and the secondary content simultaneously.

8. The computer-implemented method of claim 5, wherein:
the first interface of the one or more user devices comprises a primary video player configured to render the live primary content stream; and
the second interface of the one or more user devices comprises a secondary video player configured to render the secondary content.

9. The computer-implemented method of claim 8, wherein the metadata comprises a JSON (JavaScript Object Notation) string that is recognized by at least the secondary video player.

10. The computer-implemented method of claim 5, wherein the modification of the playback of the secondary content comprises a pause of the secondary content at the timestamp of the metadata inserted into the live primary content stream.

11. The computer-implemented method of claim 5, wherein the modification of the playback of the secondary content comprises a playback of the secondary content at the timestamp indicated in the metadata inserted into the live primary content stream.

12. The computer-implemented method of claim 5, wherein the live primary content stream is provided via an HTTP live streaming (HLS) protocol.

13. The computer-implemented method of claim 12, wherein the secondary content is retrievable from a content server within a network configured to implement the HLS protocol.

14. A computer-readable apparatus comprising a storage medium, the storage medium comprising a plurality of computer-executable instructions configured to, when executed by one or more processors, cause a computerized apparatus to:

provide a live primary content stream to one or more user devices each configured to receive the live primary content stream at a first interface and secondary content at a second interface; and insert metadata into the live primary content stream during the live primary content stream, the metadata comprising a timestamp of the secondary content and a control action being applied to the secondary content at the timestamp of the secondary content;

wherein the metadata inserted in the live primary content stream causes execution of a command at each of the one or more user devices to modify playback of the secondary content at the timestamp of the secondary content according to the control action.

15. The computer-readable apparatus of claim 14, wherein the modification of the playback of the secondary content comprises a pause of the secondary content at the timestamp of the metadata inserted into the live primary content stream.

16. The computer-readable apparatus of claim 14, wherein the modification of the playback of the secondary content comprises a playback of the secondary content at the timestamp indicated in the metadata inserted into the live primary content stream.

17. The computer-readable apparatus of claim 14, wherein each of the one or more user devices comprises a primary video player and a secondary video player, the primary video player configured to display the live primary content stream, the secondary video player configured to display the secondary content.

18. The computer-readable apparatus of claim 14, wherein:

the insertion of the metadata comprises insertion of an ID3 tag container into the live primary content stream, the ID3 tag container comprising the timestamp and the control action.

19. The computer-readable apparatus of claim 17, wherein the control action is represented in a JSON (JavaScript Object Notation) string that is recognizable by the secondary video player.

20. The computer-readable apparatus of claim 14, wherein the live primary content stream and the secondary content are provided via an HTTP live streaming (HLS) protocol.

* * * * *